(12) United States Patent
Capobianco et al.

(10) Patent No.: US 10,674,191 B2
(45) Date of Patent: *Jun. 2, 2020

(54) SYSTEMS AND METHODS TO REMOTELY SYNCHRONIZE DIGITAL DATA

(71) Applicant: Minerva Networks, Inc., San Jose, CA (US)

(72) Inventors: Fabrizio Capobianco, Redwood City, CA (US); Leandro Agrò, Milan (IT)

(73) Assignee: Minerva Networks, Inc, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/731,249

(22) Filed: May 9, 2017

(65) Prior Publication Data

US 2017/0257652 A1   Sep. 7, 2017

Related U.S. Application Data

(63) Continuation-in-part of application No. 13/857,994, filed on Apr. 6, 2013, and a continuation-in-part of application No. 13/857,995, filed on Apr. 6, 2013.
(Continued)

(51) Int. Cl.
*H04N 21/242* (2011.01)
*H04N 21/43* (2011.01)
(Continued)

(52) U.S. Cl.
CPC ....... *H04N 21/242* (2013.01); *H04N 21/2187* (2013.01); *H04N 21/4122* (2013.01);
(Continued)

(58) Field of Classification Search
CPC ............ H04N 21/2187; H04N 21/242; H04N 21/4122; H04N 21/4788
(Continued)

(56) References Cited

U.S. PATENT DOCUMENTS

| | | |
|---|---|---|
| 5,508,815 A | 4/1996 | Levine |
| 5,517,652 A | 5/1996 | Miyamoto et al. |

(Continued)

FOREIGN PATENT DOCUMENTS

| | | |
|---|---|---|
| EP | 0909095 A1 | 4/1999 |
| EP | 1117050 A1 | 7/2001 |

(Continued)

OTHER PUBLICATIONS

Minerva Networks, Inc., "Minerva Impression: Interactive Video Authoring for DVD," User's Manual, Version 1.0, 1998, pp. 1-102.
(Continued)

*Primary Examiner* — Joshua D Taylor
*Assistant Examiner* — Jaycee Imperial
(74) *Attorney, Agent, or Firm* — Carr & Ferrell LLP

(57) ABSTRACT

Provided herein are exemplary systems and methods for a "Social Cam" which is a multiple remote picture synchronization tool. Exemplary embodiments may include receiving a name of an event, a list of users, and a template, receiving from a plurality of remote computing devices digital data, each of the remote computing device associated with a user on the list of users, compositing the digital data onto the template, notifying the plurality of remote computing devices about the composited digital data and providing the plurality of remote computing devices with access to the composited digital data.

17 Claims, 11 Drawing Sheets

Related U.S. Application Data

(60) Provisional application No. 61/621,462, filed on Apr. 6, 2012, provisional application No. 61/621,464, filed on Apr. 6, 2012, provisional application No. 62/336,505, filed on May 13, 2016.

(51) Int. Cl.
*H04N 21/21* (2011.01)
*H04N 21/443* (2011.01)
*H04N 21/41* (2011.01)
*H04N 21/4788* (2011.01)
*H04N 21/2187* (2011.01)

(52) U.S. Cl.
CPC ..... *H04N 21/4302* (2013.01); *H04N 21/4788* (2013.01); *H04N 21/4431* (2013.01)

(58) Field of Classification Search
USPC .......................................................... 725/116
See application file for complete search history.

(56) References Cited

U.S. PATENT DOCUMENTS

| | | |
|---|---|---|
| 5,544,161 A | 8/1996 | Bigham et al. |
| 5,557,724 A | 9/1996 | Sampat et al. |
| 5,565,909 A | 10/1996 | Thibadeau et al. |
| 5,600,573 A | 2/1997 | Hendricks et al. |
| 5,621,456 A | 4/1997 | Florin et al. |
| 5,652,613 A | 7/1997 | Lazarus et al. |
| 5,661,516 A | 8/1997 | Carles |
| 5,701,383 A | 12/1997 | Russo et al. |
| 5,701,582 A | 12/1997 | DeBey |
| 5,724,521 A | 3/1998 | Dedrick |
| 5,758,259 A | 5/1998 | Lawler |
| 5,805,763 A | 9/1998 | Lawler et al. |
| 5,861,906 A | 1/1999 | Dunn et al. |
| 5,880,792 A | 3/1999 | Ward et al. |
| 5,892,535 A | 4/1999 | Allen et al. |
| 5,973,683 A | 10/1999 | Cragun et al. |
| 5,978,043 A | 11/1999 | Blonstein et al. |
| 6,005,631 A | 12/1999 | Anderson et al. |
| 6,014,184 A | 1/2000 | Knee et al. |
| 6,014,694 A | 1/2000 | Aharoni et al. |
| 6,020,930 A | 2/2000 | Legrand |
| 6,049,333 A | 4/2000 | Lajoie et al. |
| 6,049,831 A | 4/2000 | Gardell et al. |
| 6,075,575 A | 6/2000 | Schein et al. |
| 6,083,009 A | 7/2000 | Kim et al. |
| 6,115,740 A | 9/2000 | Mizutani |
| 6,160,545 A | 12/2000 | Eyer et al. |
| 6,160,546 A | 12/2000 | Thompson et al. |
| 6,184,878 B1 | 2/2001 | Alonso et al. |
| 6,201,536 B1 | 3/2001 | Hendricks et al. |
| 6,229,524 B1 | 5/2001 | Chernock et al. |
| 6,246,442 B1 | 6/2001 | Harada et al. |
| 6,285,685 B1 | 9/2001 | Bum |
| 6,314,569 B1 | 11/2001 | Chernock et al. |
| 6,378,129 B1 | 4/2002 | Zetts |
| 6,400,996 B1 | 6/2002 | Hoffberg et al. |
| 6,442,604 B2 | 8/2002 | Romine |
| 6,470,378 B1 | 10/2002 | Tracton et al. |
| 6,567,847 B1 | 5/2003 | Inoue |
| 6,615,244 B1 | 9/2003 | Singhal |
| 6,738,978 B1 | 5/2004 | Hendricks et al. |
| 6,766,526 B1 | 7/2004 | Ellis |
| 6,769,127 B1 | 7/2004 | Bonomi et al. |
| 6,774,926 B1 | 8/2004 | Ellis et al. |
| 6,817,028 B1 | 11/2004 | Jerding et al. |
| 6,922,843 B1 | 7/2005 | Herrington et al. |
| 6,981,045 B1 | 12/2005 | Brooks |
| 6,991,724 B2 | 1/2006 | Brodbeck et al. |
| 6,993,721 B2 | 1/2006 | Rosin |
| 7,065,342 B1 | 6/2006 | Rolf |
| 7,143,432 B1 | 11/2006 | Brooks et al. |
| 7,343,614 B1 | 3/2008 | Hendricks et al. |
| 8,869,222 B2 | 10/2014 | Winograd et al. |
| 9,510,044 B1 | 11/2016 | Pereira et al. |
| 9,756,397 B1 | 9/2017 | Bonomi et al. |
| 10,321,192 B2 | 6/2019 | Zaccone et al. |
| 2001/0001160 A1 | 5/2001 | Shoff et al. |
| 2001/0005903 A1 | 6/2001 | Goldschmidt Iki et al. |
| 2002/0007485 A1 | 1/2002 | Rodriguez et al. |
| 2002/0010917 A1 | 1/2002 | Srikantan et al. |
| 2002/0136335 A1 | 9/2002 | Liou et al. |
| 2003/0088872 A1 | 5/2003 | Maissel et al. |
| 2003/0110499 A1 | 6/2003 | Knudson et al. |
| 2003/0146940 A1 | 8/2003 | Ellis et al. |
| 2003/0149988 A1 | 8/2003 | Ellis et al. |
| 2003/0151621 A1 | 8/2003 | McEvilly et al. |
| 2003/0182659 A1 | 9/2003 | Ellis et al. |
| 2003/0195984 A1 | 10/2003 | Zisapel et al. |
| 2005/0028208 A1 | 2/2005 | Ellis et al. |
| 2005/0149988 A1* | 7/2005 | Grannan ................ H04N 7/088 725/136 |
| 2005/0229213 A1 | 10/2005 | Ellis et al. |
| 2006/0031883 A1 | 2/2006 | Ellis et al. |
| 2006/0136965 A1 | 6/2006 | Ellis et al. |
| 2006/0156375 A1 | 7/2006 | Konetski |
| 2006/0161951 A1 | 7/2006 | Hindle et al. |
| 2006/0236352 A1 | 10/2006 | Scott |
| 2006/0244818 A1* | 11/2006 | Majors ................ H04L 12/1822 348/14.08 |
| 2007/0053513 A1 | 3/2007 | Hoffberg |
| 2007/0157253 A1 | 7/2007 | Ellis et al. |
| 2007/0288959 A1 | 12/2007 | Istvan et al. |
| 2008/0091845 A1 | 4/2008 | Mills et al. |
| 2008/0177557 A1* | 7/2008 | Saul ..................... B60R 13/00 705/14.4 |
| 2009/0077589 A1 | 3/2009 | Boyer et al. |
| 2009/0094365 A1 | 4/2009 | Orady et al. |
| 2009/0118018 A1 | 5/2009 | Perlman et al. |
| 2009/0119780 A1* | 5/2009 | Ham ..................... G06F 21/10 726/26 |
| 2009/0313671 A1 | 12/2009 | Gaughan et al. |
| 2010/0083324 A1 | 4/2010 | Smith et al. |
| 2010/0119208 A1 | 5/2010 | Davis et al. |
| 2010/0211975 A1 | 8/2010 | Boyer et al. |
| 2010/0235466 A1* | 9/2010 | Jung ................. H04N 1/00137 709/217 |
| 2011/0063503 A1 | 3/2011 | Brand et al. |
| 2011/0078303 A1 | 3/2011 | Li et al. |
| 2011/0099616 A1 | 4/2011 | Mazur et al. |
| 2011/0106883 A1 | 5/2011 | Gupta et al. |
| 2011/0145881 A1* | 6/2011 | Hartman ................ H04N 7/15 725/118 |
| 2011/0246908 A1 | 10/2011 | Akram et al. |
| 2011/0247031 A1 | 10/2011 | Jacoby |
| 2011/0283203 A1* | 11/2011 | Periyannan ............ H04N 7/141 715/753 |
| 2012/0072608 A1 | 3/2012 | Peters et al. |
| 2012/0098920 A1 | 4/2012 | Pennington et al. |
| 2012/0136988 A1 | 5/2012 | Jackson |
| 2012/0159348 A1* | 6/2012 | Stroomer ............... G06F 3/0481 715/751 |
| 2012/0192016 A1 | 7/2012 | Gotesdyner et al. |
| 2012/0210379 A1 | 8/2012 | McCoy et al. |
| 2012/0226769 A1 | 9/2012 | Basso et al. |
| 2012/0331476 A1* | 12/2012 | Saffre ................... G06F 9/5038 718/104 |
| 2013/0018978 A1 | 1/2013 | Crowe et al. |
| 2013/0076980 A1 | 3/2013 | Oren et al. |
| 2013/0091284 A1 | 4/2013 | Rothschild |
| 2013/0093648 A1* | 4/2013 | Im ..................... H04N 21/4122 345/2.3 |
| 2013/0173710 A1 | 7/2013 | Seo |
| 2013/0222638 A1* | 8/2013 | Wheeler ................ G06F 3/013 348/231.2 |
| 2013/0251329 A1 | 9/2013 | McCoy et al. |
| 2013/0254820 A1 | 9/2013 | Bonomi |
| 2013/0275582 A1 | 10/2013 | Gedam et al. |
| 2013/0290502 A1 | 10/2013 | Bilobrov et al. |
| 2013/0308818 A1 | 11/2013 | MacIntosh et al. |

(56) References Cited

U.S. PATENT DOCUMENTS

| | | | |
|---|---|---|---|
| 2014/0071344 A1 | 3/2014 | Francisco | |
| 2014/0108671 A1 | 4/2014 | Watson et al. | |
| 2014/0169196 A1 | 6/2014 | Kay | |
| 2014/0189042 A1* | 7/2014 | Chen .................. | H04N 21/4756 709/213 |
| 2015/0038234 A1 | 2/2015 | Bojorquez et al. | |
| 2015/0046591 A1 | 2/2015 | Zhu et al. | |
| 2015/0089051 A1 | 3/2015 | Ojanpera | |
| 2015/0146874 A1 | 5/2015 | Ojanpera | |
| 2015/0288619 A1 | 10/2015 | Fritsch | |
| 2016/0249081 A1 | 8/2016 | Capobianco | |
| 2017/0150223 A9 | 5/2017 | Zaccone et al. | |

FOREIGN PATENT DOCUMENTS

| | | | | |
|---|---|---|---|---|
| WO | WO1998000976 A1 | 1/1998 | | |
| WO | WO2000030354 A1 | 5/2000 | | |
| WO | WO2001006800 A1 | 1/2001 | | |
| WO | WO2001038960 A1 | 5/2001 | | |
| WO | WO-2013029263 A1 * | 3/2013 | ......... | H04N 21/4756 |
| WO | WO2013079993 A1 | 6/2013 | | |
| WO | WO2013144681 A1 | 10/2013 | | |

OTHER PUBLICATIONS

Minerva Networks, Inc., "Media Demon™ Management Software for Rich-Media Delivery Services," 2000, pp. 1-2.

Minerva Networks, Inc., "Media Demon™ Management Software for Rich-Media Services", [retrieved on May 1, 2000], Retrieved from the Internet: <URL:http://www.minervanetworks.com/video_over_networks/mediademon.html>, pp. 1-3.

Minerva Networks, Inc., "Minerva VNP," [retrieved on May 1, 2000], Retrieved from the Internet: <URL:http://www.minervanetworks.com/video_over_networks/vnp.html>, pp. 1-4.

Minerva Networks, Inc., "Minerva VDK—Video Network Development Kit for VNP," [retrieved on May 2, 2000], Retrieved from the Internet: <URL:http://www.minervanetworks.com/video_over_networks/von_vdk.html>, pp. 1-4.

Ploskina, Brian, "Broadband TV? No Telephone Rewiring Necessary," publication date unknown, 1 page.

Smith, G.L. et al., "Design of Multimedia Services," BT Technology Journal, vol. 13, No. 4, BT Laboratories, GB, Oct. 1995, pp. 21-31.

Whyte, W.S., "The Many Dimensions of Multimedia Communications," BT Technology Journal, vol. 13, No. 4, BT Laboratories, GB, Oct. 1995, pp. 9-20.

Brull, Steve et al., "Sony's New World," BusinessWeek, May 27, 1996. Issue 3477, p. 100-108, [retrieved on Feb. 8, 2011], Retrieved from the Internet: <URL:http://www.businessweek.com/1996/22/b3477134.hmt>, 10 pages.

Krause, "HP Set-Top Maneuvers Accent NCTA," Electronic News, May 30, 1994. vol. 40, No. 2016, 2 pages.

Tedesco, Richard, "New Modems Ease Net Access," Broadcasting & Cable, Jun. 21, 1999, vol. 129, No. 26, p. 64.

Wilson, Carol, "Content Is Key," Telephony, Jul. 18, 1994. vol. 227, No. 3, p. 21-28.

Minerva Networks, Inc., Minerva Impression: Interactive Video Authoring, [retrieved on May 1, 2000], Retrieved from the Internet: <URL:http://www.minervanetworks.com/dvd_solutions/Impression.html>, 3 pages.

Hassel et al., "Electronic Program Guide With Digital Storage," U.S. Appl. No. 09/157,256, filed Sep. 17, 1998, Incorporated by Reference in Ellis et al (US 200610136965), filed Sep. 21, 1998, 101 pages.

Ellis et al., "Client Server Based Interactive Television Program Guide System for Remote Server Recorder," U.S. Appl. No. 09/332,244, filed Jun. 11, 1999, Incorporated by Reference in Ellis et al (US 2006/0136965), 131 pages.

Merriam Webster: "Personal", [online], [retrieved on Oct. 23, 2012], Retreived from the Internet: <https://www.merriam-webster.com/personal>, 2 pages.

Dictionary.com: "Personal"[online], [retrieved on Oct. 23, 2012], Retreived from the Internet: <http://dictionary.OAerence.com/browse/personal>, 3 pages.

Cao, et al., "Method and System for Pausing and Replaying Scheduled Media Rich Broadcasts," U.S. Appl. No. 09/585,707, filed May 31, 2000, Specification, Claims, Abstract, and Drawings, 32 pages.

Cao, et al., Method and System for Recording Scheduled Programs Without Local Recording Equipment, U.S. Appl. No. 09/586,247, filed May 31, 2000, Specification, Claims, Abstract, and Drawings.

* cited by examiner

SYSTEMS AND METHODS TO REMOTELY SYNCHRONIZE DIGITAL DATA

CROSS REFERENCE TO RELATED APPLICATION

This application is a continuation in part of U.S. Non-Provisional application Ser. No. 13/857,994, filed on Apr. 6, 2013, titled "System and Methods of Synchronizing Program Reproduction on Multiple Geographically Remote Display Systems," which claims the priority benefit of U.S. Provisional Application Ser. No. 61/621,464, filed on Apr. 6, 2012, titled "Voice-Enabled Social TV Experience" and also claims the priority benefit of U.S. Provisional Application Ser. No. 61/621,462, filed on Apr. 6, 2012, titled "Method to Synchronize Multiple TVs," all of which [Fish] are hereby incorporated by reference in their entirety, including all references and appendices cited therein. This application is also a continuation in part of U.S. Non-Provisional application Ser. No. 13/857,995, filed on Apr. 6, 2013, titled "System and Methods of Communicating between Multiple Geographically Remote Sites to Enable a Shared, Social Viewing Experience," which claims the priority benefit of U.S. Provisional Application Ser. No. 61/621,464, filed on Apr. 6, 2012, titled "Voice-Enabled Social TV Experience" and also claims the priority benefit of U.S. Provisional Application Ser. No. 61/621,462, filed on Apr. 6, 2012, titled "Method to Synchronize Multiple TVs," all of which [Fish] are hereby incorporated by reference in their entirety, including all references and appendices cited therein. This application also claims the benefit and priority of U.S. Provisional Application Ser. No. 62/336,505, filed on May 13, 2016, titled "Method to Remotely Synchronize Photos" which is hereby incorporated by reference in its entirety, including all references and appendices cited therein.

FIELD OF INVENTION

The present disclosure is directed to the remote synchronization of digital data.

SUMMARY

According to some exemplary embodiments, the present disclosure is directed to a method for remote synchronization of digital data, including receiving a name of an event, a list of users, and a template, receiving from a plurality of remote computing devices digital data, each of the remote computing device associated with a user on the list of users, compositing the digital data onto the template, notifying the plurality of remote computing devices about the composited digital data and providing the plurality of remote computing devices with access to the composited digital data. Further methods include transmitting the digital data as a stream from each of the plurality of remote computing devices and the stream comprising digital data automatically captured by each of the plurality of remote computing devices after receiving a triggering signal. Additionally, the triggering signal may be initiated by one of the plurality of the remote computing devices and the digital data may be transmitted as a plurality of digital data images.

Additional methods include capturing audio digital data, compositing of the digital data onto the template within a predefined time limit, identifying a remote computing device unable to transmit the digital data within the predefined time limit and adjusting computing resources available to the identified remote computing device so that it can transmit the digital data within the predefined time limit. Also included is transmitting the composited digital data to a public display device and transmitting the captured audio digital data to a public address system. Methods may include continuing to transmit newly received audio digital data after the compositing and/or where the received audio digital data is associated with a performing entity at the event. A volume or a magnitude of the received audio digital data may be represented on the public address system.

Further methods may include the event being live and being viewed on television by the user on the list of users and transmitting the composited digital data to the live event. Additionally, the transmitting may be to a public display device at the live event and the public display device is viewable on the television by the user on the list of users. Moreover, the template may include content related to the live event. The transmitting of content from the live event may be made to the plurality of remote computing devices. The digital data may also comprise three to nine seconds of video digital data or may be a series of images displayed sequentially as a live picture. Additionally, the template may be dynamic and/or include an advertisement.

In some exemplary embodiments, a Bluetooth low energy signal may activate a program on a personal digital assistant to trigger a Social Cam. Also, content associated with the event may be included with the composited digital data. The Bluetooth low energy signal may also activate a secure key on the program evidencing a copyright license to a user for recording a portion of the event. The composited digital data may be printed or downloaded onto a thumb drive.

DESCRIPTION OF THE DRAWINGS

Certain embodiments of the present technology are illustrated by the accompanying figures. It will be understood that the figures are not necessarily to scale. It will be understood that the technology is not necessarily limited to the particular embodiments illustrated herein.

DETAILED DESCRIPTION

The Internet has changed everything. Users all belong to a distributed community. Users manage friendships through social networks. Users use the Internet to leave a trail of their existence. Most users enjoy a shared memory, online. Today, more than ever, pictures are the best and most used tool to share experiences.

Space is not the limit anymore. To the contrary, time has been stretched. Real-time rules. Users are happy when the first LIKE is added to a post, and users are nervous when they have to wait for such acknowledgement.

In this new world, where time and space have been bended by social networks, users share experiences more than ever. And the experiences users share tend to be remote experiences:

Users watch TV with a tablet in their lap.
Users attend online courses with remote classmates.
Users belong to the same gaming community.
Users chat on social networks through their smartphones, and much more.

In this new world, every second people create and share memories. Not that long ago, on Facebook, for example, 250 million pictures were uploaded daily. On Instagram, 4 million pictures were uploaded daily, which triggered 100 comments each. Instagram was acquired by Facebook for one billion dollars, and Instagram was just an app to shoot and share pictures.

Despite this enormous activity, all of the picture sharing is based on pictures that are not "shared." Everybody can share their own picture, but this never represents a memory of a shared experience, such as a shared experience of friends who are geographically spread across the planet.

Provided herein is a tool that allows people to share a common experience, even if they are physically in different locations. A tool that creates a single picture by combining a set of pictures, each picture taken by a different individual on their camera. A truly shared picture. This tool enables a new way of sharing experiences online, which has key applications in many areas, including targeted advertising.

The "Social Cam" or multiple remote picture synchronization tool, is the answer to the evolution of internet social behaviors. It is extremely relevant to build more precise networks of user relations. The exemplary embodiments described herein solve the multiple remote picture synchronization problem.

Figure 1:
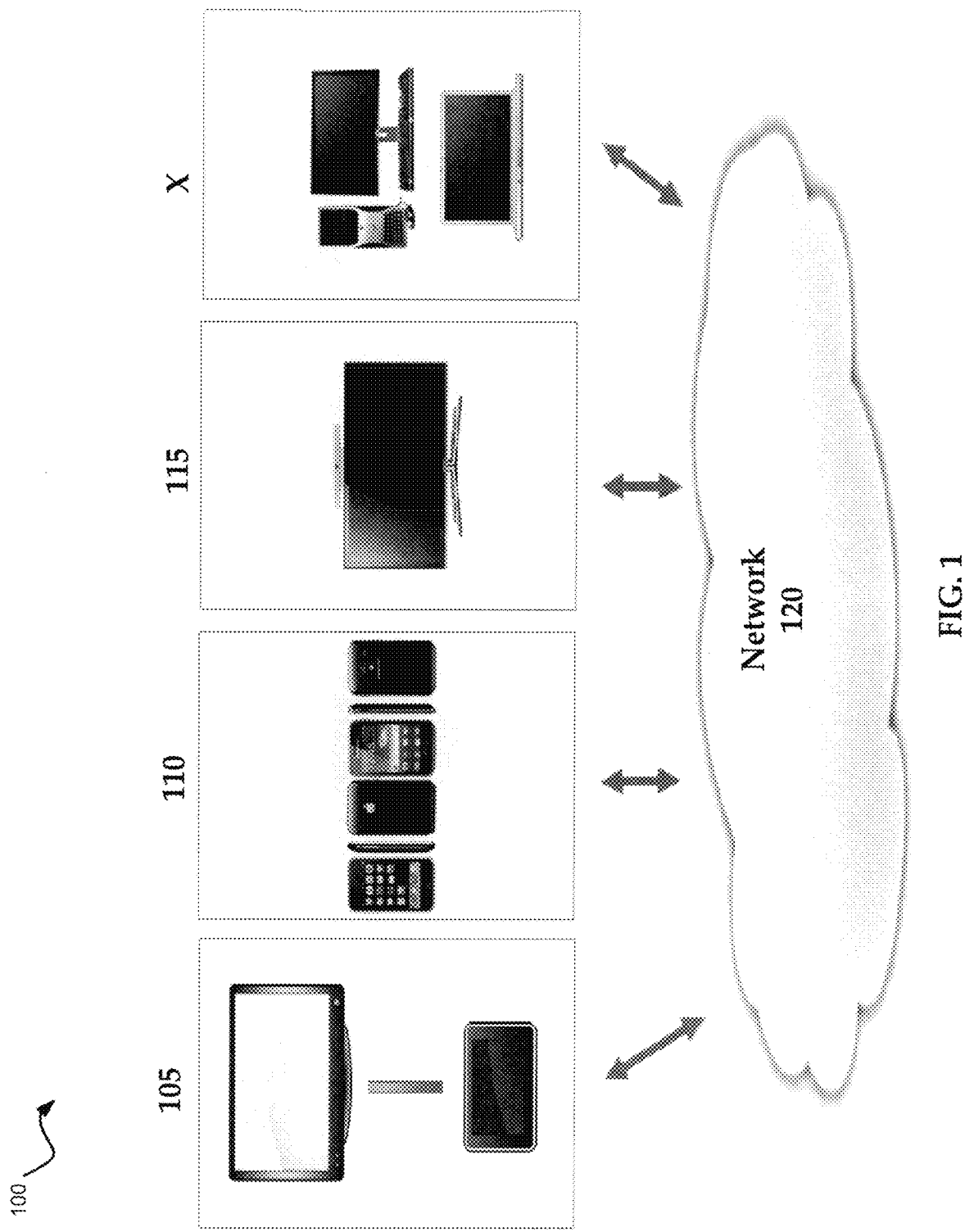
FIG. 1 is a diagram of exemplary actors in the Social Camera environment.

FIG. 1 is a diagram of exemplary actors in the Social Camera environment.

Shown in environment 100 are user devices 105 through X, and network 120.

Multiple remote users connect via different devices to shoot pictures through the camera on their device. A cloud service controls the interaction of the different devices. The devices include, for example, but are not limited to:

Mobile phones.
Tablets.
Laptop and desktop personal computers with embedded cameras.
Televisions with embedded cameras.
Point and shoot connected cameras.
Picture frames with embedded cameras.

The "Social Cam" or multiple remote picture synchronization tool works on virtually any device with a camera and that has the capability to connect to a network. Network connectivity may be on a local area network ("LAN") or the Internet, via a wired or wireless connection (e.g. Wi-Fi, 3G, 4G, satellite, etc.).

Figure 2:
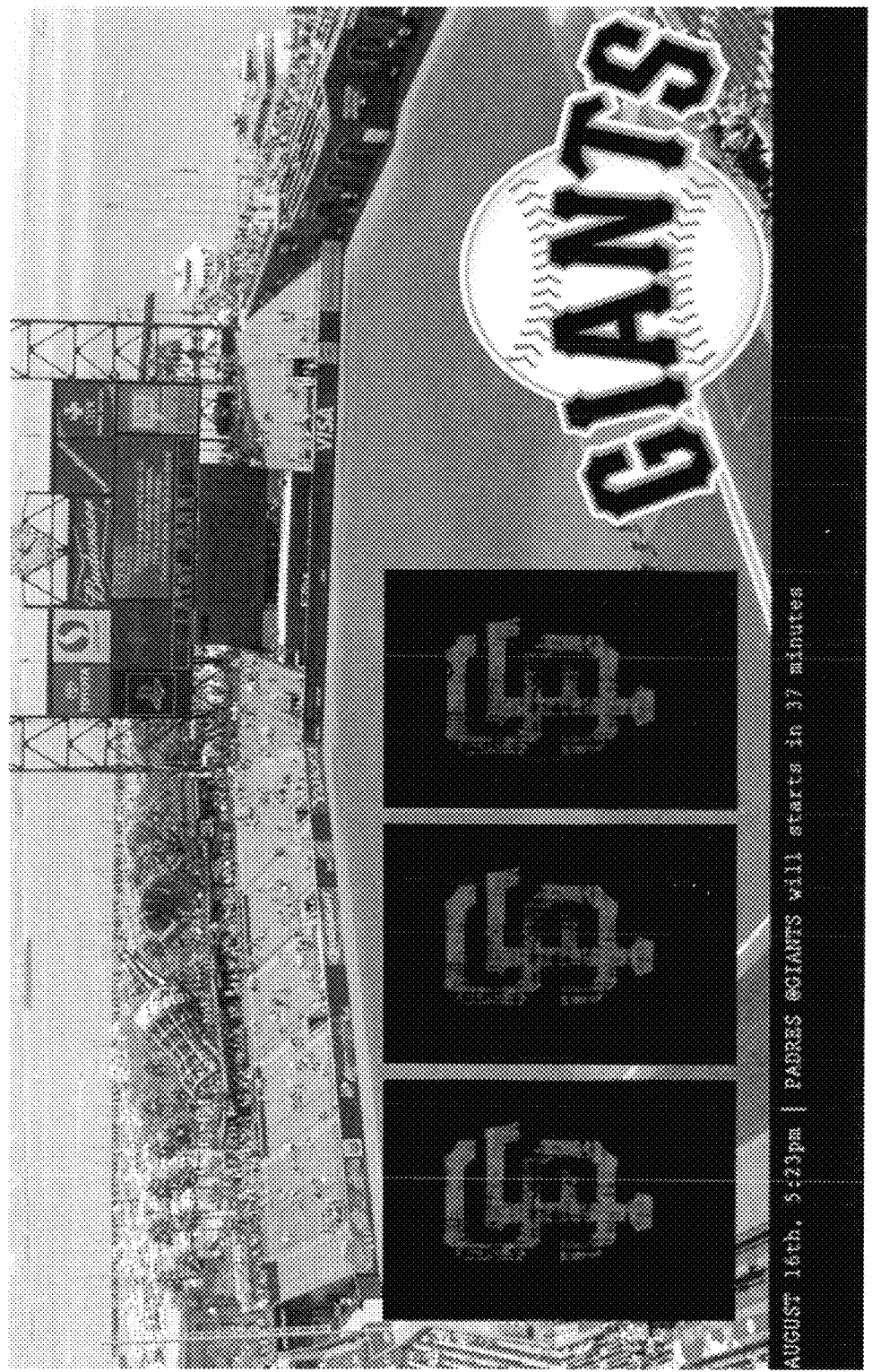
FIG. 2 is a diagram of an exemplary background picture.

FIG. 2 is a diagram of an exemplary background picture.

Shown in background picture 200 are three rectangles marked "SF" where digital data, such as images may be composited.

According to exemplary embodiments, creating the perfect "context" for shared experiences includes an event, a list of users and a template. In some exemplary embodiments, the event is a reason why users would like to have a shared memory (e.g. a baseball game or a private party). The users participate in the event, either in person (e.g. a wedding) or remotely (e.g. a baseball game watched in front of each user's TV). The users can be considered as actors in taking a picture and creating a collage, which can be shared later. The visual template, such as that shown in FIG. 2 represents the background of the picture collage. It is a picture with "holes", which are filled by parts of the pictures taken by each user.

As shown in FIG. 2, this example is based on a background image (which potentially could be provided by a television network in near real time) with a pre-defined set of shaped holes to hold the pictures of all of the Social Cam users. According to various exemplary embodiments, a cloud service adds to the final picture specific information linked to the event that the users are experiencing. In the baseball game example, it could mean the time when the picture was taken, the teams playing, the final score and additional information.

In various exemplary embodiments, Social Cam pictures are "live", changing with time. For example, a picture from a baseball game could keep showing the real-time game score and then update itself with the final score, when the game is over.

Figure 3:
FIG. 3 is a diagram of an exemplary "pose with your friends" example.

FIG. 3 is a diagram of an exemplary "pose with your friends" example.

Shown in the "pose with your friends" example 300 are dark silhouettes where digital data, such as images may be composited.

As shown in FIG. 3, a slightly advanced version of the template allows users to be included in the final shared picture by "fitting a particular hole". Every user is assigned (randomly, by choice of the initiator of the event, or by the individual choice) a specific shape which they will have to try to match with their camera.

Figure 4:
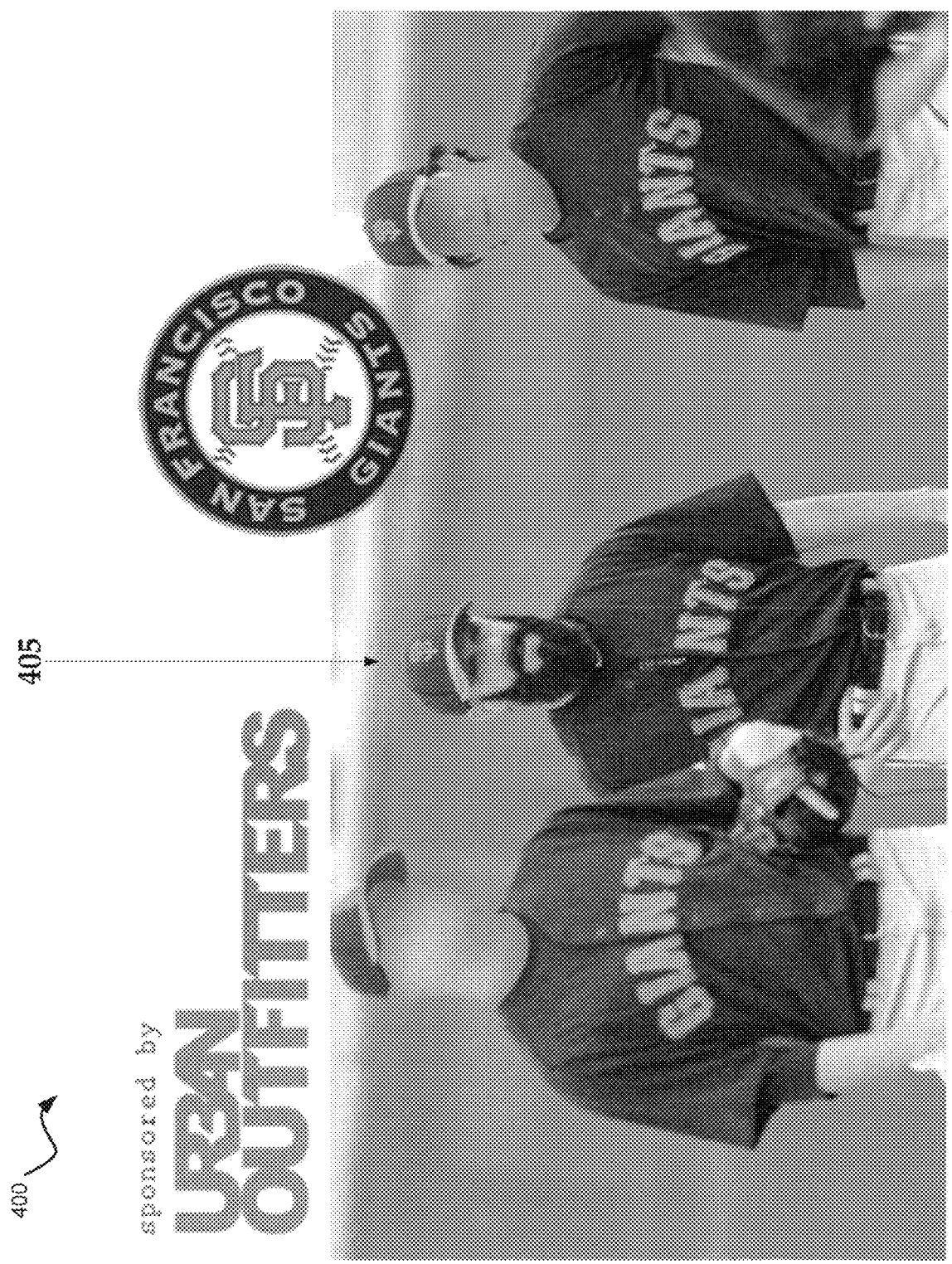
FIG. 4 is a diagram of an exemplary "pose with your hero" example.

FIG. 4 is a diagram of an exemplary "pose with your hero" example.

Shown in the "pose with your hero" example 400 are two blurred faces on either side of the hero 405 where digital data, such as images may be composited.

Other preset templates may be prepared by sponsors who own the rights to the image.

Figure 5:
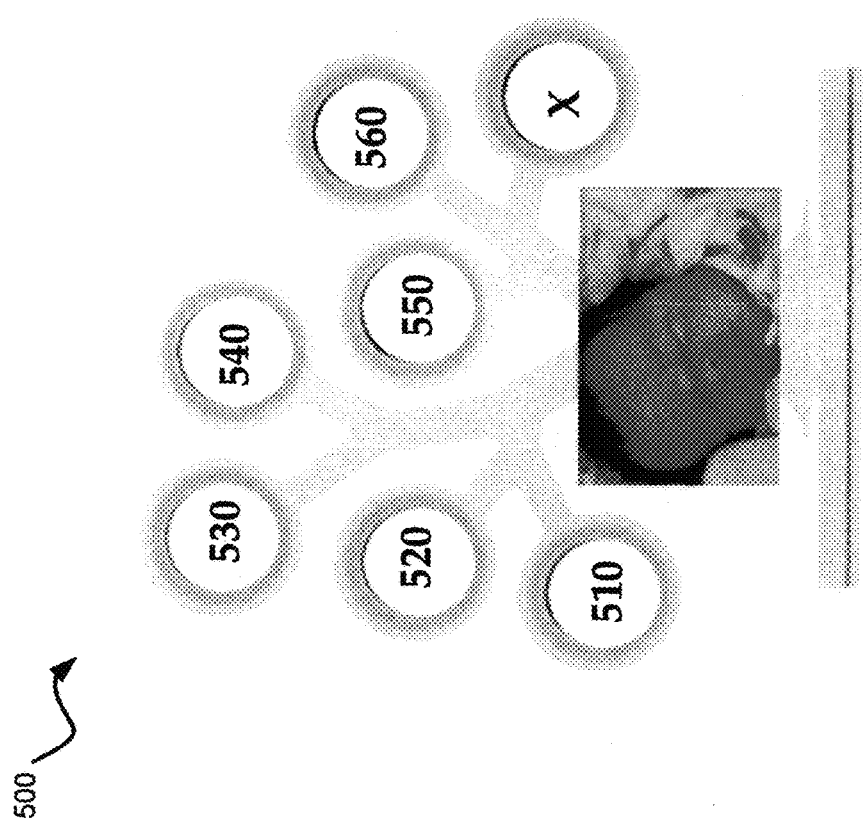
FIG. 5 is a diagram of an exemplary newborn example.

FIG. 5 is a diagram of an exemplary newborn example.

Shown in the newborn example 500 are spots 510 through X where digital data, such as images may be composited.

In this example, the newborn is surrounded by a tree of "connected" love, and this tree is colored and takes shape according to the number of people that are included in the picture.

Figure 6:
FIG. 6 is a diagram of an exemplary wedding example.

FIG. 6 is a diagram of an exemplary wedding example.
Shown in the wedding example 600 are spots where digital data, such as images may be composited. Here, all of the friends join in the celebration with a picture. Additionally, the wedding example 600 may be mounted on an object.

Figure 7:
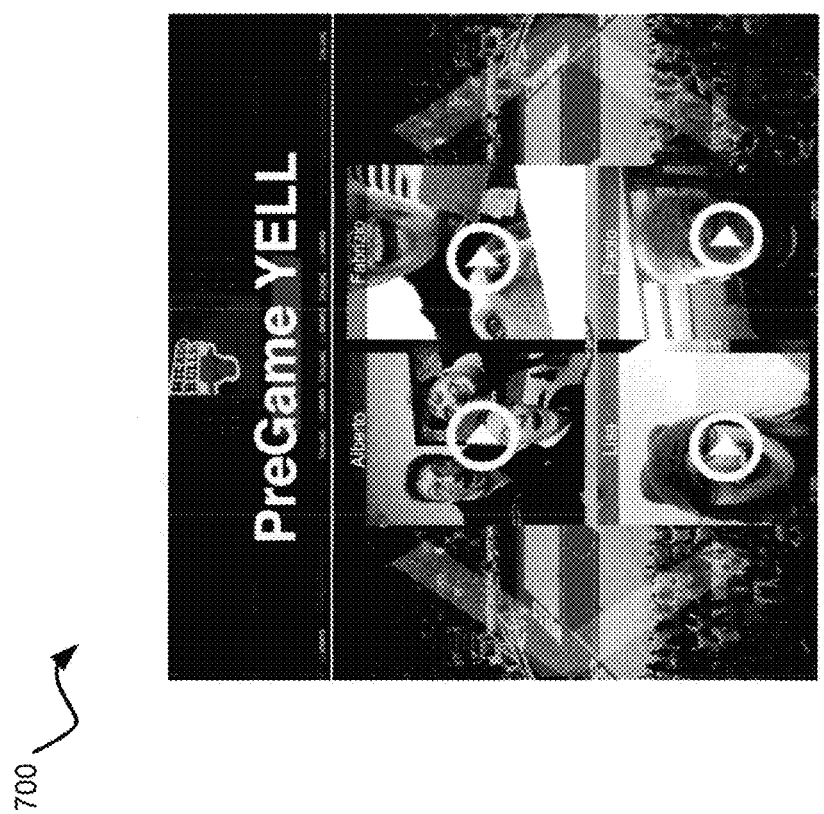
FIG. 7 is a diagram of an exemplary pregame yell screen.

FIG. 7 is a diagram of an exemplary pregame yell screen.
Shown on pregame yell screen 700 are four users via their respective social cam devices preparing to yell while connected to a cloud service.

Figure 8:
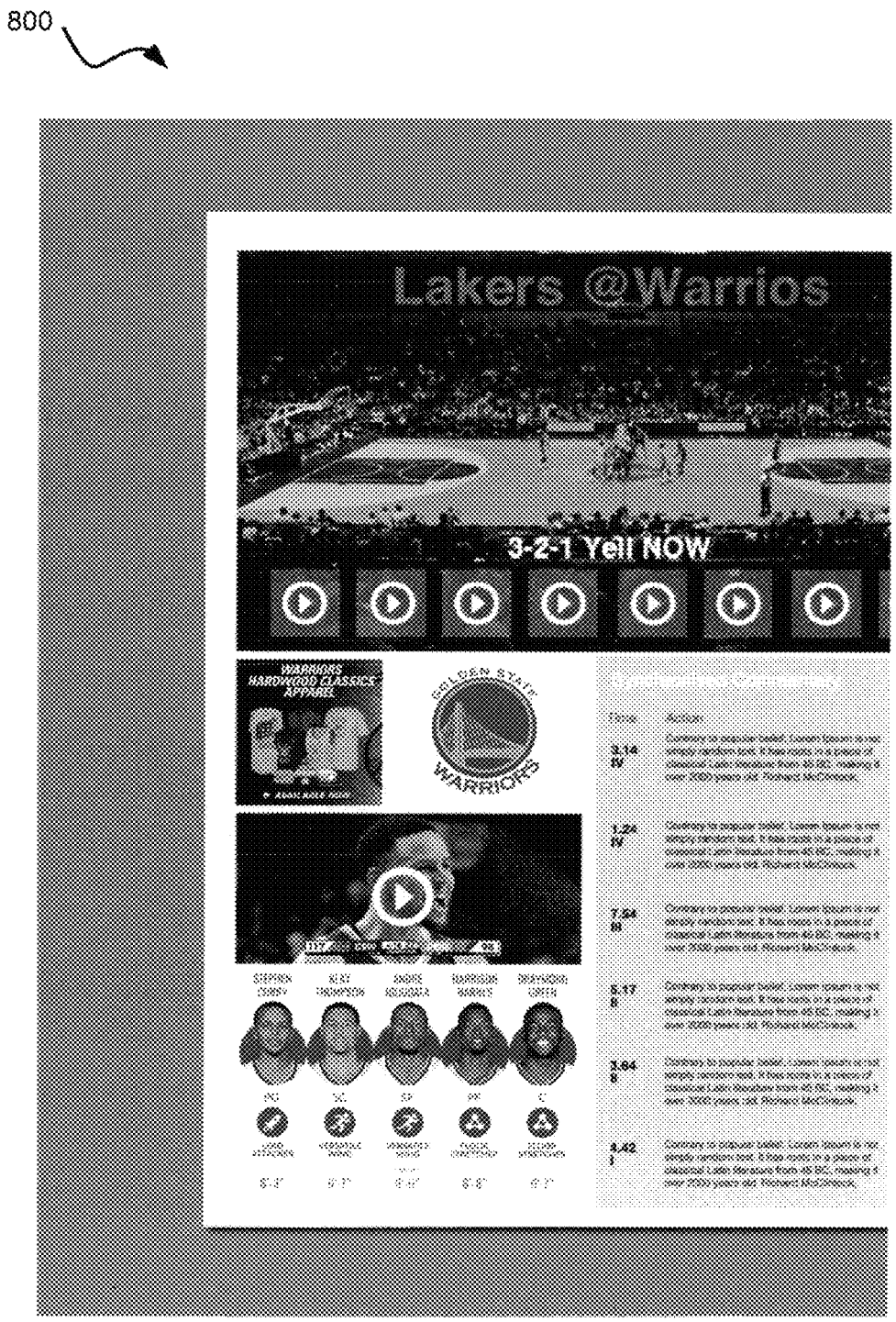
FIG. 8 is a diagram of an exemplary game yell screen.

FIG. 8 is a diagram of an exemplary game yell screen.
Shown on game yell screen 800 is a "3-2-1 Yell NOW" countdown.

Figure 9:
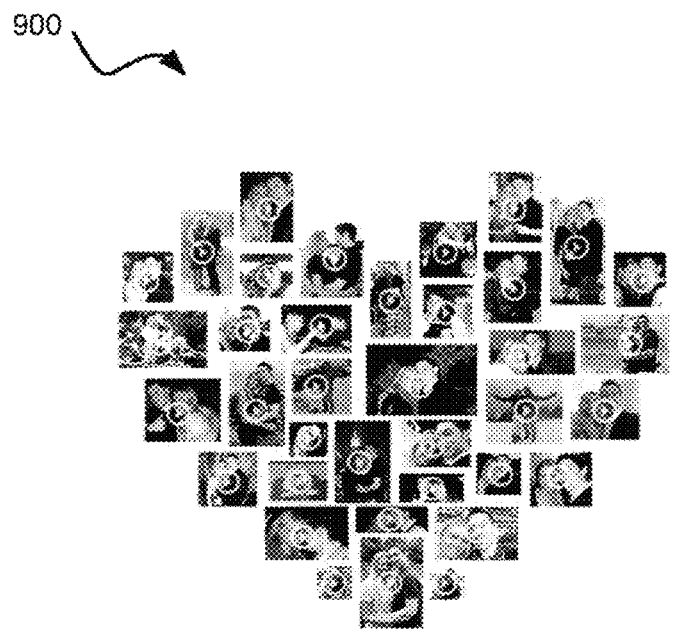
FIG. 9 is a diagram of an exemplary composited digital data.

FIG. 9 is a diagram of an exemplary composited digital data.

Shown on template 900 are various pictures forming a heart shape.

According to various exemplary embodiments, the "Social Cam" or the multiple remote picture synchronization tool operates under two different scenarios: real-time and off-line.

Figure 10:
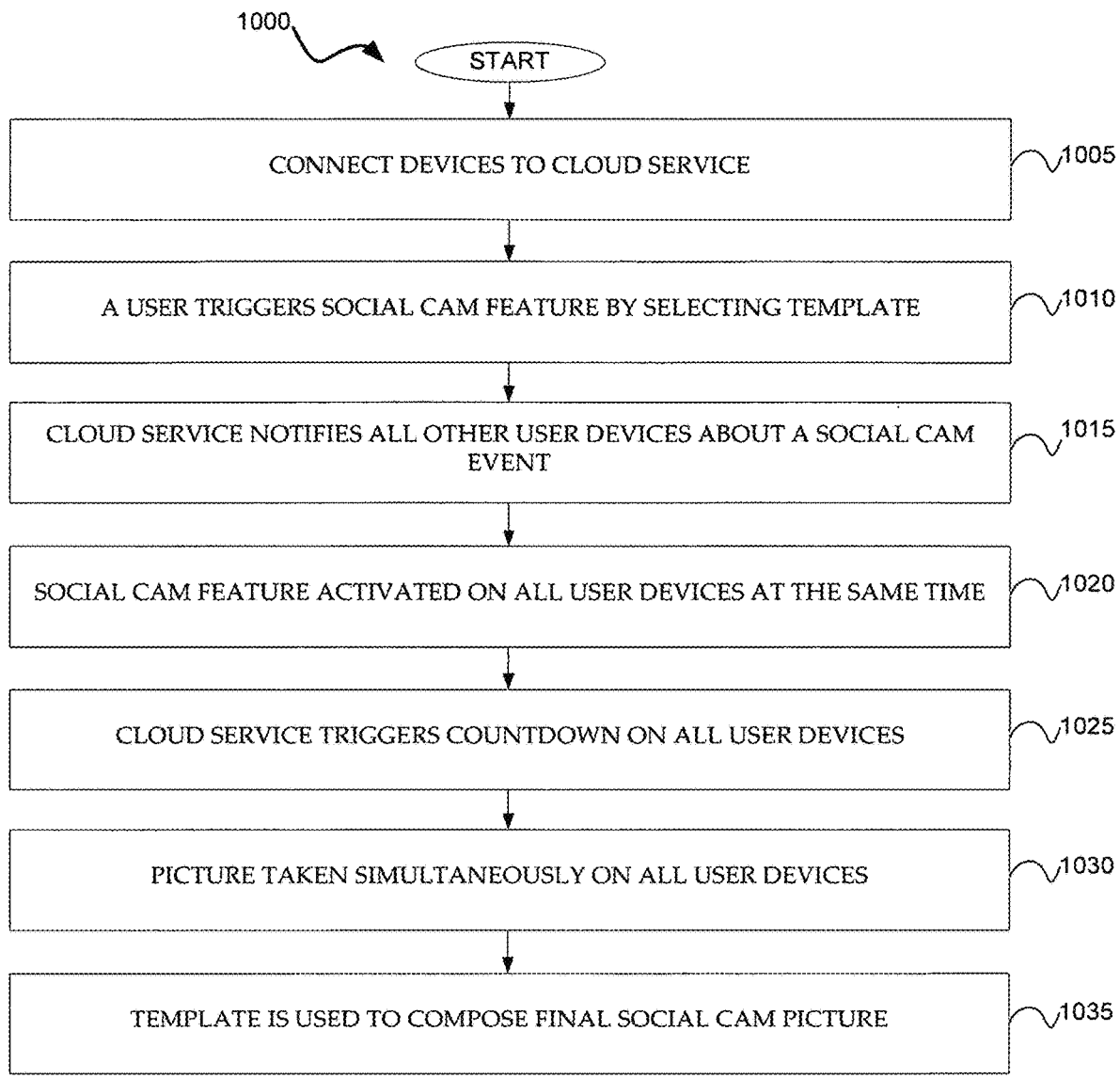
FIG. 10 is an exemplary flow chart for a method of using the Social Cam in real-time.

FIG. 10 is an exemplary flow chart for a method 1000 of using the Social Cam in real-time. In the real-time scenario, all users are connected at the same time (for example, in a chat).

At step 1005, all users in a group connect their respective devices to a cloud service.

At step 1010, one of the users triggers the Social Cam feature on their device by selecting a specific template (which could be shared or hidden from the other users). The device of the user triggering the feature will request a Social Cam activity to the cloud service.

At step 1015, the cloud service notifies all of the other user devices in a group that a Social Cam event is about to happen.

At step 1020, on all of the user devices in the group, at the same time, the Social Cam feature will be activated. Alternatively, a request for a Social Cam event will be visually perceptible on all of the user devices in the group. In this case, only the devices of the users accepting the Social Cam event will be involved in the event.

At step 1025, a countdown will be triggered by the cloud service on each user device in the group.

At step 1030, a picture is taken simultaneously on all of the user devices in the group.

At step 1035, the template (from step 1010) is used to compose the final Social Cam picture, which can be shared or hidden from the other users in the group. Users with access to the Social Cam picture will be able to save it or share it via email, social networks, upload on photo sites and so on. Third party services can be integrated to allow printing (on paper, on clothing or on objects) or 3D printing of the Social Cam picture.

Figure 11:
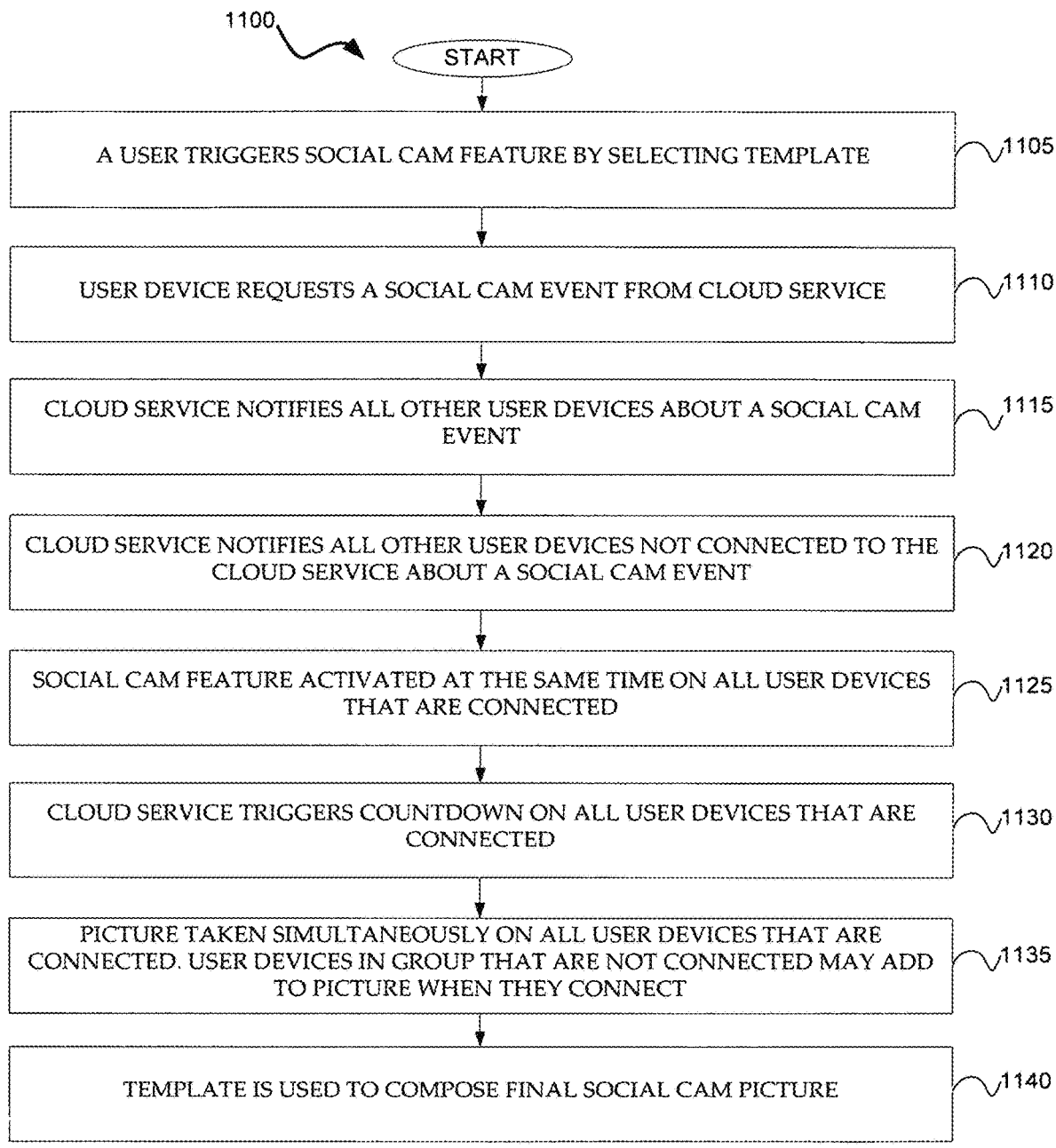
FIG. 11 is an exemplary flow chart for a method of using the Social Cam off-line

FIG. 11 is an exemplary flow chart for a method 1100 of using the Social Cam off-line. With off-line synchronization, not all of the users are connected at the same time. They might have participated at the same event (for example, watching a game) at different times. Some of the user devices might still be connected to the event, some of the user devices might have left the event.

At step 1105, one of the users in the group of users triggers the Social Cam feature on their respective device, selecting a specific template (which could be shared or hidden from the other users).

At step 1110, the device of the user triggering the Social Cam feature requests a Social Cam event to a cloud service.

At step 1115, the cloud service notifies all of the other user devices in the group that a Social Cam event is about to happen.

At step 1120, the devices of the users in the group that are not connected to the cloud service are notified. If in response to the notification a user in the group activates their device, they will be able to participate in a real-time Social Cam event. If a user does not activate their device, they will still be able to add to the group picture at a later time.

At step 1125, the devices of the users in the group that are connected to the cloud service, will activate the Social Cam feature.

Alternatively, a request for a Social Cam event can be visualized on the user devices in the group. In this case, only the devices of the users accepting the Social Cam event will be involved in the event. For those users who do not accept the Social Cam event, the Social Cam will be available at a later time. According to some exemplary embodiments, the Social Cam event has an "expiration date", after which it will not be possible for the invited users to add to their picture.

At step 1130, each of the devices of the users in the group that are connected and not connected to the cloud service receive a countdown.

At step 1135, a picture is simultaneously taken on all of the user devices that are connected to the cloud service, and all of the users in the group that are not connected to the cloud service will be allowed to add to the picture when they connect.

At step 1140, the template is used to compose the final Social Cam picture, which can be shared or hidden from the other users. Users with access to the Social Cam picture may save it or share it via email, social networks, upload on photo sites and so on. Third party services may be integrated to allow printing (on paper, on clothing or on objects) or 3D printing of the Social Cam picture.

One issue with remote synchronization is the timing of the synchronization, in order to make sure the pictures are all taken at the same time, without adding delays for individual users that are on a slower network. In some exemplary environments, the cloud service sends each user device in a group a ping command to evaluate the time needed by the cloud service to reach each user device in the group. The delay will then be used by the cloud service to properly time the photo shooting, to make sure it happens at the same exact time (or as close as possible). Considering that the time to transport the command "shoot now" over a network is measured in milliseconds, it should have a close to zero delay in most cases. This feature therefore generates a perfectly synced experience, which might be useful in some cases (e.g. when a home run is hit in a baseball game).

In exemplary further embodiments, additional features of the Social Cam include pick the best shot. This is where a user takes multiple shots in sequence, then picks the best picture. This would remove the surprised facial effect, and allow individual users to be more satisfied of the final result.

In exemplary further embodiments, additional features of the Social Cam include geotagging. Geotagging allows the Social Cam to extract the location of a user device (via GPS or other means), when available and authorized by the user. This information could be used to enhance the final Social Cam picture, including the location in the world of each participant. This would create the ability to put individual pictures on a map and more.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

If any disclosures are incorporated herein by reference and such incorporated disclosures conflict in part and/or in whole with the present disclosure, then to the extent of conflict, and/or broader disclosure, and/or broader definition of terms, the present disclosure controls. If such incorporated disclosures conflict in part and/or in whole with one another, then to the extent of conflict, the later-dated disclosure controls.

The terminology used herein can imply direct or indirect, full or partial, temporary or permanent, immediate or delayed, synchronous or asynchronous, action or inaction. For example, when an element is referred to as being "on," "connected" or "coupled" to another element, then the element can be directly on, connected or coupled to the other element and/or intervening elements may be present, including indirect and/or direct variants. In contrast, when an element is referred to as being "directly connected" or "directly coupled" to another element, there are no intervening elements present. The description herein is illustrative and not restrictive. Many variations of the technology will become apparent to those of skill in the art upon review of this disclosure.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A method for remote synchronization of digital data, the method comprising:
    receiving a name of an event, a list of users, and a template;
    receiving digital data from a plurality of remote computing devices, each of the remote computing devices associated with a user on the list of users;
    compositing the digital data onto the template;
    notifying the plurality of remote computing devices about the digital data composited onto the template;
    providing the plurality of remote computing devices with access to the digital data composited onto the template; and further comprising:
    the event being live and being synchronized by a cloud server on the plurality of remote computing devices by scheduled checks based on a computed time interval with the computed time interval between the scheduled checks being doubled compared to a previous check if at the previous check the transmitted event is synchronized on each of the remote computing devices and the scheduled checks being set to a minimum time interval if at the previous check the transmitted event is not synchronized on each of the remote computing devices.

2. The method of claim 1, wherein the digital data is transmitted as a stream from each of the plurality of remote computing devices.

3. The method of claim 2, wherein the stream comprises the digital data automatically captured by each of the plurality of remote computing devices after receiving a triggering signal.

4. The method of claim 3, wherein the triggering signal is initiated by one of the plurality of the remote computing devices.

5. The method of claim 1, wherein the digital data is transmitted as a plurality of digital data images.

6. The method of claim 1, further comprising capturing audio digital data.

7. The method of claim 1, further comprising the compositing of the digital data onto the template within a predefined time limit.

8. The method of claim 7, further comprising identifying a remote computing device unable to transmit the digital data within the predefined time limit and adjusting computing resources available to the identified remote computing device so that it can transmit the digital data within the predefined time limit.

9. The method of claim 1, further comprising transmitting the composited digital data to a public display device.

10. The method of claim 6, further comprising transmitting the captured audio digital data to a public address system.

11. The method of claim 10, further comprising continuing to transmit newly received audio digital data after the compositing.

12. The method of claim 11, wherein the newly received audio digital data is associated with a performing entity at the event.

13. The method of claim 12, wherein a volume or a magnitude of the newly received audio digital data is represented on the public address system.

14. The method of claim 1, wherein the event is live and being viewed on television by the user on the list of users.

15. The method of claim 1, wherein the digital data comprises a series of images displayed sequentially as a live picture.

16. The method of claim 1, wherein the template is dynamic and includes an advertisement.

17. The method of claim 4, further comprising a Bluetooth® low energy signal activating a program on one of the plurality of remote computing devices that causes the triggering signal.

* * * * *